United States Patent [19]

Brännström et al.

[11] Patent Number: 4,655,147
[45] Date of Patent: Apr. 7, 1987

[54] PLANT FOR THE COMBUSTION OF PARTICULATE FUEL IN A FLUIDIZED BED

[75] Inventors: Roine Brännström; Martin Mansson, both of Finspong, Sweden

[73] Assignee: ASEA Stal AB, Västerås, Sweden

[21] Appl. No.: 826,045

[22] Filed: Feb. 4, 1986

[30] Foreign Application Priority Data

Feb. 18, 1985 [SE] Sweden ................................ 8500750

[51] Int. Cl.⁴ .............................................. F23C 11/02
[52] U.S. Cl. .................................. 110/263; 60/39.464; 110/104 R; 110/245; 122/4 D; 431/170; 432/58
[58] Field of Search ................... 110/245, 263, 104 R, 110/104 B, 327, 186; 122/4 D; 431/170; 34/57 A; 432/58; 60/39.464

[56] References Cited

U.S. PATENT DOCUMENTS

| | | | |
|---|---|---|---|
| 4,092,094 | 5/1978 | Lingl, Jr. .................... | 110/104 R X |
| 4,250,816 | 2/1981 | Angevihe et al. .......... | 110/104 R X |
| 4,257,334 | 3/1981 | Mueller ..................... | 110/104 R |
| 4,340,000 | 7/1982 | Hein ......................... | 110/245 |
| 4,356,779 | 11/1982 | Porter et al. ............... | 110/245 |
| 4,368,678 | 1/1983 | Ulveling ................... | 110/263 X |
| 4,414,905 | 11/1983 | Beranek et al. ............ | 110/245 |
| 4,421,036 | 12/1983 | Brannstrom et al. ........ | 110/186 |
| 4,436,459 | 3/1984 | Caldwell ................... | 406/181 |
| 4,474,119 | 10/1984 | Jones ........................ | 110/263 X |
| 4,582,454 | 4/1986 | Brandenburg et al. ..... | 110/104 R X |

FOREIGN PATENT DOCUMENTS

| | | |
|---|---|---|
| 108505 | 5/1984 | European Pat. Off. . |
| 498123 | 5/1930 | Fed. Rep. of Germany . |
| 510896 | 10/1930 | Fed. Rep. of Germany . |
| 433740 | 6/1984 | Sweden . |

Primary Examiner—Albert J. Makay
Assistant Examiner—Steven E. Warner
Attorney, Agent, or Firm—Pollock, Vande Sande & Priddy

[57] ABSTRACT

A plant for combustion of a particulate fuel in a fluidized bed in a combustion chamber has the fuel supplied into the bottom of the combustion chamber by means of a pneumatic transportation system via nozzles. Fuel for the plurality of nozzles is transported through a duct to a distributor and from there via individual conduits to the nozzles of the combustion chamber. These conduits include flow-inhibiting, pressure-drop generating means, by means of which a pressure drop is generated between the distributor and the combustion chamber. These pressure-drop inducing means influence the velocity of flow and hence the transport capacity of the transport gas so that a desired, normally uniform, distribution of fuel to the bed is secured.

20 Claims, 13 Drawing Figures

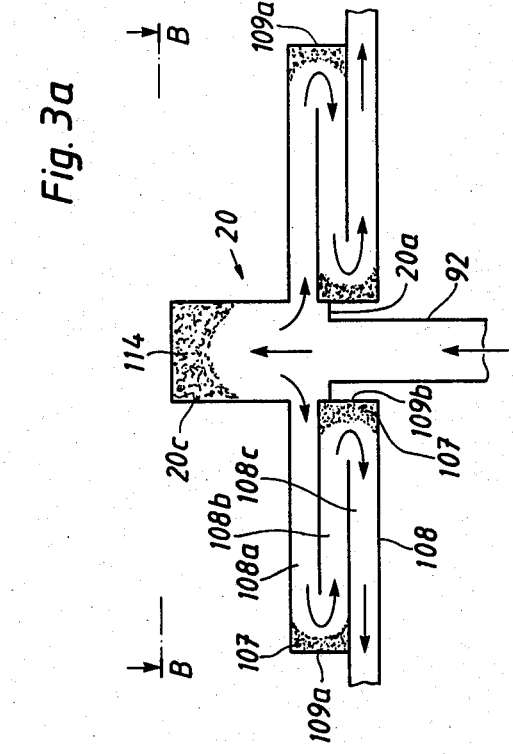
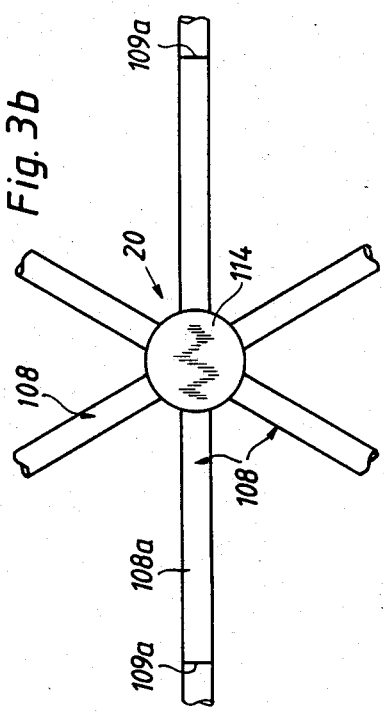
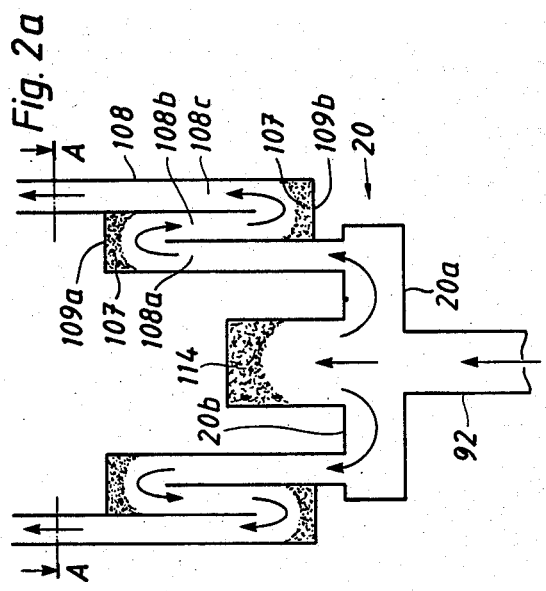
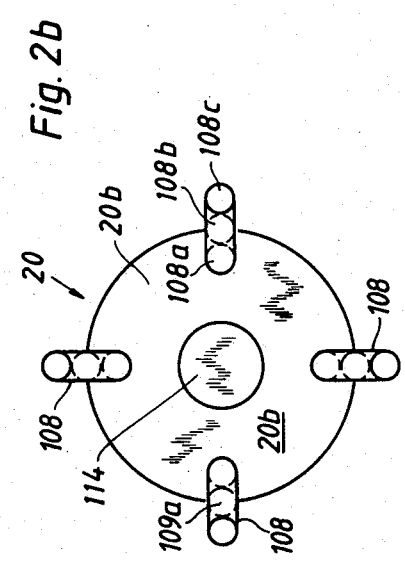

PLANT FOR THE COMBUSTION OF PARTICULATE FUEL IN A FLUIDIZED BED

TECHNICAL FIELD

The invention relates to a fuel combustion plant in which a particulate fuel, in particular crushed coal, is burnt in a fluidized bed, the fuel being supplied to the bed via a pneumatic transportation system terminating in a plurality of fuel nozzles. The combustion plant may be a power station having a combined gas-steam turbine cycle, in which the fluidized bed combustion chamber is enclosed in a pressure vessel and operates at a pressure of up to about 2 MPa and generates propellent gas for one or more gas turbines and steam for a steam turbine (i.e. a PFBC plant), or a heating unit for, for example, a district heating plant, in which the fluidized bed combustion chamber is operated at approximately atmospheric pressure (i.e. an AFBC plant).

DISCUSSION OF PRIOR ART

It is known to feed pulverized coal into a fluidized bed, contained in a combustion chamber, through a number of fuel feed nozzles at or in the bottom of the combustion chamber. To obtain favorable combustion conditions, the fuel has to be evenly distributed in the fluidized bed, and normally there is at least one nozzle per square meter of bed, or one nozzle per 20 $MW_t$ of combustion chamber power, which means that in a combustion chamber for high power there may be 10 to 20 nozzles. Normally, one feeding device, mechanical or pneumatic, is provided for each nozzle, which involves a number of parallel rotary vane feeders or other means for the control of the fuel flow and separate feeding conduits leading to each fuel nozzle of the combustion chamber.

OBJECT OF THE INVENTION

One object of the invention is to provide a simplified pneumatic transport system for the feeding of particulate fuel into a fluidized bed in a combustion chamber, in which system the number of conduits between the fuel storage area and the combustion chamber is reduced to a minimum.

SUMMARY OF THE INVENTION

The aforesaid object is achieved by means of a device for dividing the fuel-gas flow into several fuel-gas flows close to the combustion chamber, preferably in very close proximity to the fuel feed nozzles, in such a way that the required amount of fuel is supplied to the bed through each one of the nozzles. According to a preferred arrangement, the combustion plant comprises fuel containers having a flow-controlling discharge device, for example a rotary feeder, a pressure medium source for transport gas and a conveying pipe connected to the fuel discharge device. Through this discharge device and the conveying pipe, fuel is conveyed for a plurality of fuel nozzles from the fuel containers all the way to a fuel distributing chamber, where the flow of transport gas and fuel is divided into several subflows which are led to the separate fuel nozzles. From these sub-flows there are a number of conveying pipes, one for each nozzle, between the distributing chamber and the respective nozzle. Each one of these conveying pipes is formed in such a way as to obtain a considerable pressure drop in the transport gas. This pressure drop is of such a magnitude as to obtain a self-stabilizing operation which achieves the required distribution of the fuel. In principle, the pressure drop can be accomplished by locating a throttle means in the conduit. Since particulate material, such as crushed coal, is highly abrasive, the pressure drop is suitably accomplished by diverting the flow of gas and particulate material one or more times between the distributing chamber and the nozzles. A number of tube parts may be included in the conduit, which are connected by chambers where a gas flow deflection of, 90° or more, for example, 180° is obtained. These chambers can be formed in a known manner with a blind space in which an erosion-reducing cushion of particulate material can collect.

The distributing chamber may be formed in many ways. However, considerable attention must be paid to the abrasive nature of the fuel. To reduce abrasion, the distributing chamber can be formed so that the supply fuel duct means opens out just opposite to a blind space having such a shape that a wear-preventing cushion of the fuel can collect therein. Another way is to arrange, immediately before the distributing chamber, a chamber, suitably bent through 90°, in which the fuel is decelerated. Along the short distance available for acceleration between the chamber and the inlet, larger fuel grains will not be able to accelerate up to the gas speed, so that reduced wear of the walls of the distributing chamber is to be expected.

BRIEF DESCRIPTION OF THE DRAWINGS

The invention will now be described in greater detail, by way of example, with reference to the accompanying drawings, wherein:

FIGS. 2a, 3a, 4a, 5a, 6a and 7a are vertical sections through six different arrangements of fuel distribution equipment for the plant of FIG. 1, and FIGS. 2b, 3b, 4b, 5b, 6b and 7b are views in the directions of the arrows A—A, B—B, C—C, D—D, E—E and F—F, respectively, of the equipment shown in FIGS. 2a–7a.

DESCRIPTION OF PREFERRED EMBODIMENT

Figure 1:
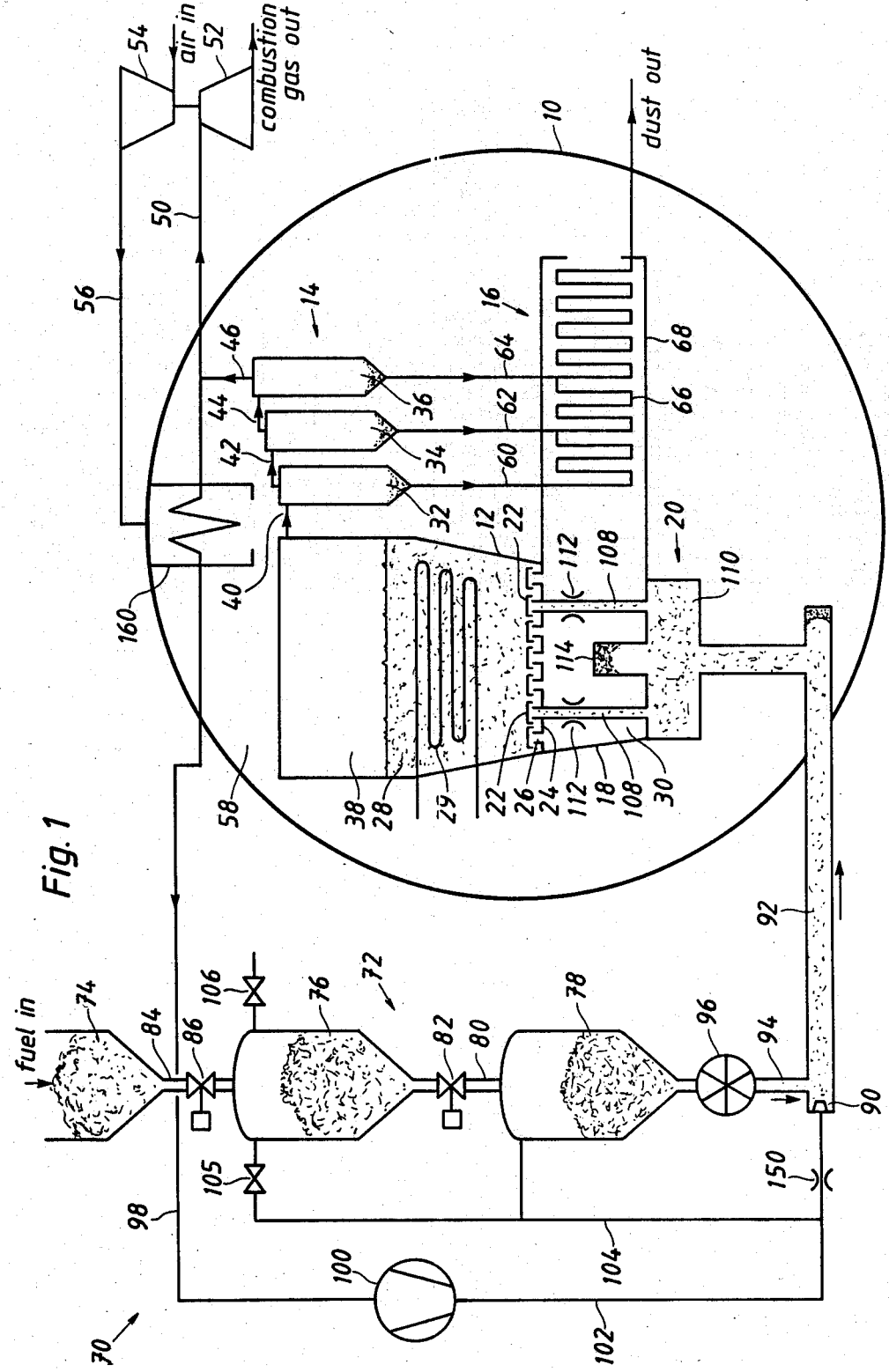
FIG. 1 shows schematically a PFBC plant to which the invention is applied.
Figure 7A:
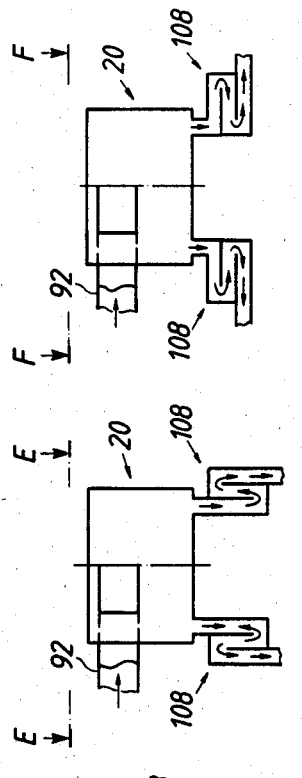
Figure 7B:
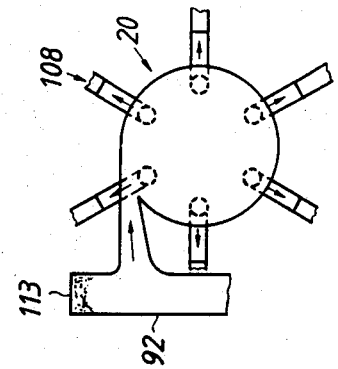
Figure 6A:
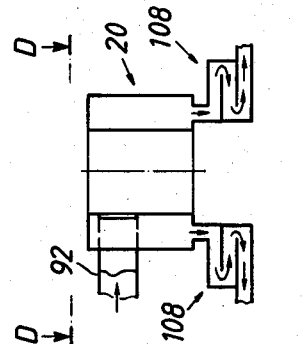
Figure 6B:
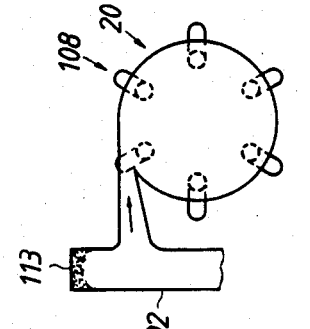

In FIG. 1, 10 designates a pressurized container of a PFBC plant. This includes a combustion chamber 12, a cleaning plant 14 for separating out dust from the combustion gases leaving the combustion chamber 12, a dust discharge system 16, an air plenum chamber 18, a fuel distributor 20, which distributes supplied fuel to a number of fuel nozzles 22 in a bottom plate 24, and a cooler 160 for the transport gas used for fuel transportation. At the bottom of the combustion chamber 12 there are also, in addition to the fuel feed nozzles 22 (only two of which are shown), a number of air nozzles 26 through which air is supplied to the combustion chamber 12 from a space 30 in the air plenum 18. The air is used for combustion of fuel in a bed 28 of the chamber 12 and for fluidization of the bed 28. The bed 28 has tubes 29 therein for cooling and thereby controlling the temperature of the bed. In these tubes 29 steam is generated which is supplied to a steam turbine (not shown).

The cleaning plant 14 comprises a number of groups of series-connected cyclones 32, 34, 36. Combustion gases leaving the fluidized bed 28 accumulate in a freeboard 38 and flow through a conduit 40 to the cyclone 32 and from there through further conduits 42 and 44 to the cyclones 34 and 36. The gases leave the cyclone 36 via a conduit 46. A major part of the cleaned gases is led via a conduit 50 to a gas turbine 52 which drives a compressor 54. The compressor 54 feeds a space 58 in the pressure vessel 10 with combustion air via a conduit 56. The gases leaving the turbine 52 are led to a steam boiler (not shown), where the remaining heat energy is utilized for generation of steam to a steam turbine.

Dust which is separated in the cyclones 32, 34, 36 is passed via the conduits 60, 62, 64 to the dust discharge system 16, which can be, for example, of the kind disclosed in U.S. patent application Ser. No. 445,635 filed on Nov. 30, 1982 in the name of Roine Brännström and assigned to the assignee of this application. This dust discharge system is, at the same time, formed as a cooler. A dust transport duct 66 of the dust discharge system 16 is arranged in a channel 68 which leads combustion air from the space 58 to the space 30 in the air plenum 18. Heat in the dust and its transport gas is thus utilized for preheating the combustion air.

A transportation plant 70 for fuel comprises a sluice system 72 of the lock-hopper type for feeding fuel from a container 74, which is under atmospheric pressure, to the combustion chamber 12 which operates at an overpressure which may amount to 1.5-2.0 MPa (15-20 bar). The sluice system 72 includes two pressure vessels 76 and 78. These are interconnected by a conduit 80 with a sluice valve 82. The containers 74 and 76 are interconnected via a conduit 84 with a sluice valve 86. The container 78 is connected to an ejector 90 in a conveying pipe 92 to the fuel distributor 20 via a conduit 94 with a rotary feeder 96, by means of which the amount of fuel supplied is controlled in a manner known per se. Inert transport gas for the fuel is obtained from the cyclone 36 via the conduit 46, the gas cooler 160, a branch conduit 98, a booster compressor 100 and a conduit 102, which is connected to the ejector 90. The booster compressor 100 may be driven by a motor or by the turbine 52 and may also be connected to a generator/motor which is able to drive the compressor upon start-up of the plant. The containers 76 and 78 are connected, via a conduit 104, to the conduit 102. A valve 105 is arranged immediately upstream of the container 76. The container 76 is also provided with a blow-off valve 106. In the container 76 the pressure is maintained at the same or a somewhat higher level than in the pressure vessel 10, for example by means of a throttle means 150 with a suitably chosen throttling capacity.

For transferring fuel from the container 74 to the container 76, the valve 105 is shut and the valve 106 is opened so that the pressure is reduced to atmospheric level. Thereafter, the sluice valve 86 is opened so that fuel falls down into the container 76. Thereafter, the valves 86 and 106 are shut and the valve 105 opened so that the pressure again rises to the same level as in the container 78. The sluice valve 82 is now opened and the fuel in the container 76 falls down into the container 78. The sluice valve 82 is next closed and the fuel feed cycle can then be repeated as and when required.

In view of the risk of explosion, particularly when feeding in finely divided fuel, it is suitable to use a gas which has a low-oxygen content for the pressurization of the containers 76 and 78 and for the transportation of the fuel in the conduit 92, chamber 110 of the distributor 20 and conduits 108 all the way to the combustion chamber 12. A low-oxygen content gas will be leaving the cyclone 36 and that is why this gas is fed to the conduit 98. The gas taken from the cyclone 36 is cooled by the combustion air from the compressor 54 in the cooler 160, to a level suitable for the compressor 100 and the sluice system 72. The heat content of this part of the combustion gas is then utilized for preheating the combustion air and is thus recovered.

The fuel from the conveying pipe 92 is distributed in the fuel distributor 20 so that a substantially equal amount of fuel is supplied to the bed 28 in the combustion chamber 12 through each one of the conduits 108 and its fuel nozzle 22. To obtain a uniform distribution of the fuel in each conduit 108, between the chamber 110 of the distributor 20 and the fuel nozzles 22, each conduit 108 is formed in such a way as to obtain a pressure fall which is necessary for uniform distribution. In FIG. 1, a throttling means 112 for providing the required pressure drop in each conduit 108 is shown. The pressure drop in each conduit should exceed 10 kPa (0.1 bar). An appropriate value of this pressure drop may be 20-50 kPa (0.2-0.5 bar).

Opposite to the inlet, the flow distributor 20 is suitably formed with a blind space 114 to collect a cushion of fuel therein which prevents wear on the distributor wall.

A fuel distributor designed according to the invention is self-stabilizing so that a substantially uniform distribution of fuel to each of the connected nozzles 22 is always obtained. The construction of the conduits 108, so as to obtain a drop in pressure between the space 110 and the nozzles 22, is the solution to the problem of non-uniform distribution.

The drop in pressure between the space 110 and the nozzles 22 can be expressed as $$\Delta p = \xi(\tau) \frac{\rho \cdot v^2}{2}$$

where
$\xi$ = coefficient of pressure drop = $f(\tau)$
$\tau = \dot{m}_{dust}/\dot{m}_{gas}$ = fuel flow/transport gas flow = mass flow ratio
$\rho$ = density of transport gas, and
$v$ = speed of transport gas in the conduits 108.

The $\xi$-function is generally a straight line, that is, the coefficient of pressure drop increases linearly with the mass ratio. It is substantially dependent on the number of direction changes produced by each conduit but is also to a certain extent dependent on the precise form of the direction changes and the adhesive properties of the fuel.

Since the conduits 108 emanate from a common space 110 and also open out into a common space, the pressure drop $\Delta p$ will be equal for all the conduits 108. If the fuel flow in one conduit tends to increase or decrease, this means that the transport capacity decreases or increases and the amount of transported fuel also decreases or increases. The result is that the fuel which is supplied to the distributor 20 will be uniformly distributed in the same proportions between the outgoing conduits 108 and thus between the nozzles 22. If the dimensions and coefficients of pressure drop $\xi$ of all the conduits 108 are the same, the fuel will be distributed equally between the nozzles 22. If the dimensions and/or coefficients of pressure drop $\xi$ are different, the fuel will be distributed among the nozzles 22 in dependence on these differences. A desired distribution of fuel over the cross-section of a combustion chamber 12 can thus be obtained. A non-uniform distribution, with larger amounts of fuel, for example, fed to the periphery of the combustion chamber 12, may be desirable in order to obtain a uniform temperature over the entire fluidized bed 28. This facility for pressure control is a valuable advantage resulting in more efficient and simplied operation both in the case of pressurized and non-pressurized fluidized bed combustion plants.

The distributor 20 and the throttling means 112 employed for the generation of the required pressure drop can be designed in many different ways. In the embodiment shown in FIGS. 2a and 2b, the distributor 20 consists of a cylinder in which the feed conduit 92 is connected to one end wall 20a and the conduits 108 to the opposite end wall 20b. The pressure drop arises in chambers 109a and 109b of each conduit 108 as a result of the losses which arise when the flow is diverted through 180° as the particulate flow flows from a tube part 108a to a tube part 108b and from the tube part 108b further to a tube part 108c. FIG. 2a shows the protective cushion of fuel in the blind space 114 and also similar cushions in the blind spaces 107 between the tube parts 108a/b and 108b/c.

In the embodiment shown in FIGS. 3a and 3b, the conduits 108 are connected to a cylindrical wall 20c of the distributor 20, and extend radially therefrom. Each conduit includes the components 108a, 108b, 108c, 109a, 109b and 107 as the FIGS. 2a, 2b embodiment.

Figure 4A:
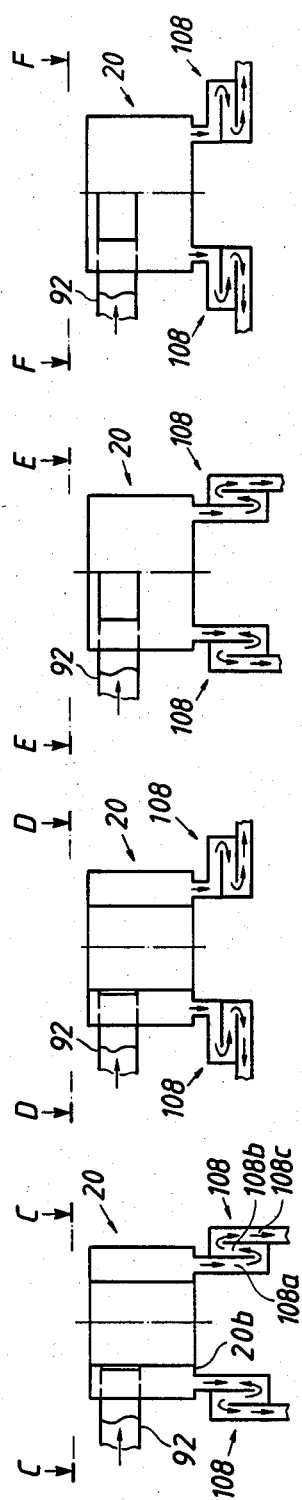
Figure 4B:
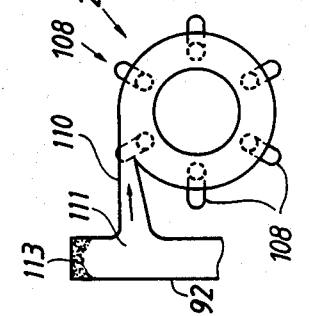

In the embodiment shown in FIGS. 4a and 4b, the distributor 20 is made in the form of a cylindrical ring. The flow of fuel and gas is introduced tangentially via the short conduit 110, which is connected to the conduit 92 by a 90° bend 111 with a blind space 113 to reduce the inlet speed of coarse material in order to reduce wear. The conduits 108 are connected to an end wall 20b and axially oriented. Once again each conduit has parts 108a, 108b and 108c linked by two 180° bends.

Figure 5A:
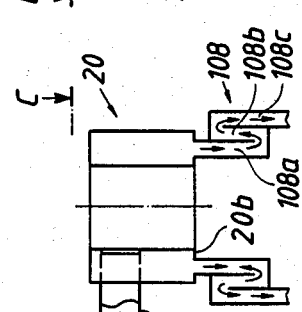
Figure 5B:
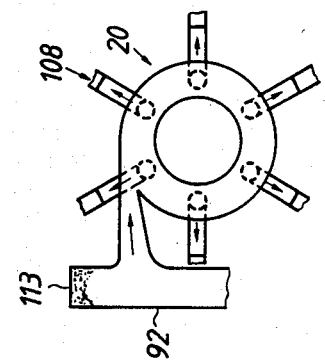

The distributor 20 shown in FIGS. 5a and 5b is the same as the distributor 20 shown in FIG. 4, except that the conduits 108 are now radially oriented.

The distributors 20 shown in FIGS. 6a, 6b and 7a, 7b differ from the distributors 20 shown respectively in FIGS. 4a, 4b and 5a, 5b only in that the former are formed as a cylinder instead of as a ring.

Where or how the throttling means 112 generating the pressure drop is located in the conduit 108 appears to be of no significance. They may be placed adjacent to the distributor 20, adjacent to the nozzles 22, or in any other suitable location along the conduit 108. If equal distribution of fuel to all the nozzles is desired, all the conduits 108 are made with the same cross-section and coefficient of pressure drop $\xi$. If, on the other hand, an unequal distribution is desired, the conduits 108 are made with different cross-sections and/or with different coefficients of pressure drop $\xi$. The coefficient of pressure drop $\xi$ may be varied by inserting a varying number of chambers 109 in different conduits 108. The length of the conduit has no or little effect, since the coefficient of pressure drop $\xi$ is in all essentials dependent on the number of chambers 109 provided for deflection of the flow. Since a pressure drop is created in each deflection, the diameter of the conduit can be freely chosen within wide limits, for example so as to obtain a transport speed which is acceptable from the point of view of erosion of the conduit wall.

The invention is not to be seen as limited to the specific arrangements illustrated since many modifications can be made thereto within the scope of the following claims.

We claim:

1. A fuel combustion plant for combustion of a particulate fuel material comprising:
   a combustion chamber;
   a bed of particulate material contained in said chamber;
   a bottom in said chamber with nozzles for introducing particulate fuel and nozzles for introducing air for fluidizing said bed and combustion of said fuel;
   a compressor for compressing said air;
   a pneumatic fuel delivering system having an upstream conduit for delivering particulate fuel and transport gas to a fuel distributor;
   a plurality of downstream conduits, each connecting an individual fuel nozzle with said distributor; and,
   a pressure drop generating means in each of said downstream conduits between said distributor and said fuel nozzle comprising two tube parts connected in series by a chamber for diverting a flow of said particulate fuel and transport gas such that said generating means has a predetermined coefficient of pressure drop, the coefficients of pressure drop of the generating means in said plurality of downstream conduits being selected to cause said fuel distributor to provide a desired distribution of said fuel among said fuel nozzles.

2. A plant according to claim 1, in which said combustion chamber and said fuel distributor are arranged within a surrounding container for enclosing pressurized combustion air, and in which said fuel distributor is connected by said upstream fuel delivering conduit to other components of said fuel delivering system outside of said container.

3. A plant according to claim 1, in which each downstream conduit comprises two or more pressure drop generating means in series.

4. A plant according to claim 3, in which said combustion chamber and said fuel distributor are arranged within a surrounding container for enclosing pressurized combustion air, and in which said fuel distributor is connected by said upstream fuel delivering conduit to other components of said fuel delivering system outside of said container.

5. A power plant according to claim 1 in which the tube parts connected together with the flow diverting chamber are parallel and arranged adjacent to each other so that said flow of particulate fuel and transport gas is deflected through 180° in said flow diverting chamber.

6. A plant according to claim 5, in which said combustion chamber and said fuel distributor are arranged within a surrounding container for enclosing pressurized combustion air, and in which said fuel distributor is connected by said upstream fuel delivering conduit to other components of said fuel delivering system outside of said container.

7. A plant according to claim 1, in which the pressure drop generating means creates a pressure drop in excess of 10 kPa (0.1 bar) in each downstream conduit.

8. A plant according to claim 7, in which said combustion chamber and said fuel distributor are arranged within a surrounding container for enclosing pressurized combustion air, and in which said fuel distributor is connected by said upstream fuel delivering conduit to other components of said fuel delivering system outside of said container.

9. A plant according to claim 1, in which the flow diverting chambers are formed with a blind space for forming an erosion-reducing cushion of the particulate fuel opposite the upstream tube part.

10. A plant according to claim 9, in which said combustion chamber and said fuel distributor are arranged within a surrounding container for enclosing pressurized combustion air, and in which said fuel distributor is connected by said upstream fuel delivering conduit to other components of said fuel delivering system outside of said container.

11. A plant according to claim 1, in which each downstream conduit extends axially from the distributor.

12. A plant according to claim 11, in which said combustion chamber and said fuel distributor are arranged within a surrounding container for enclosing pressurized combustion air, and in which said fuel distributor is connected by said upstream fuel delivering conduit to other components of said fuel delivering system outside of said container.

13. A plant according to claim 1, which further comprises means for pressurizing combustion gas from said combustion chamber to provide transport gas for the fuel delivering system.

14. A plant according to claim 13, in which said combustion chamber and said fuel distributor are arranged within a surrounding container for enclosing pressurized combustion air, and in which said fuel distributor is connected by said upstream fuel delivering conduit to other components of said fuel delivering system outside of said container.

15. A plant according to claim 1, in which said coefficients of pressure drop are such that a substantially equal amount of particulate fuel is supplied to the combustion chamber through each of said downstream conduits and the corresponding fuel nozzle.

16. A plant according to claim 15, in which said combustion chamber and said fuel distributor are arranged within a surrounding container for enclosing pressurized combustion air, and in which said fuel distributor is connected by said upstream fuel delivering conduit to other components of said fuel delivering system outside of said container.

17. A plant according to claim 1, in which the fuel delivering conduit upstream of the distributor opens out into the distributor opposite to a blind space for forming an erosion-reducing cushion of the particulate fuel.

18. A plant according to claim 17, in which said combustion chamber and said fuel distributor are arranged within a surrounding container for enclosing pressurized combustion air, and in which said fuel distributor is connected by said upstream fuel delivering conduit to other components of said fuel delivering system outside of said container.

19. A plant according to claim 17, in which each downstream conduit extends radially from the distributor.

20. A plant according to claim 19, in which said combustion chamber and said fuel distributor are arranged within a surrounding container for enclosing pressurized combustion air, and in which said fuel distributor is connected by said upstream fuel delivering conduit to other components of said fuel delivering system outside of said container.

* * * * *